United States Patent
Pilati et al.

(10) Patent No.: US 6,245,370 B1
(45) Date of Patent: Jun. 12, 2001

(54) METHOD FOR PRODUCING PIZZA (75) Inventors: Marco Pilati, Tassullo; Pierluigi Malfatti, Pergine; Claudio Torghele, Trento, all of (IT)

(73) Assignee: Carpos, S.A. (CH)

( * ) Notice: Subject to any disclaimer, the term of this patent is extended or adjusted under 35 U.S.C. 154(b) by 0 days.

(21) Appl. No.: 09/294,702

(22) Filed: Apr. 19, 1999

Related U.S. Application Data (63) Continuation-in-part of application No. PCT/EP98/05093, filed on Aug. 12, 1998.

(30) Foreign Application Priority Data

Aug. 19, 1997 (IT) ................................. 97A000044

(51) Int. Cl.⁷ .................................................... A21D 13/00
(52) U.S. Cl. .......................... 426/289; 426/292; 426/293; 426/296; 426/503; 426/505; 426/512; 426/516; 426/518; 426/496
(58) Field of Search .................................. 429/289, 292, 429/293, 296, 512, 516, 518, 496, 503, 505

(56) References Cited

U.S. PATENT DOCUMENTS 3,735,692   5/1973   Marchignoni ........................ 99/353
5,921,170 * 7/1999   Khatchadourian et al. ........... 99/349
5,997,924 * 12/1999  Olander, Jr. et al. ................ 426/296

FOREIGN PATENT DOCUMENTS

| 0056346 | 7/1982 | (EP) . |
| 0554926 | 11/1993 | (EP) . |
| 0708421 | 4/1996 | (EP) . |
| 9013229 | 11/1990 | (WO) . |

* cited by examiner

Primary Examiner—Milton Cano
(74) Attorney, Agent, or Firm—Saul Ewing LLP (57) ABSTRACT

A method for mechanically and automatically producing flat, round, dough and/or pizza bases without the use of baking tins for the dough bases and without using preprepared bases. Toppings and/or sauce are applied to the dough bases through at least one topping station. The dough bases are prepared from dough ingredients in a kneading and extrusion device, and then passed through a series of processing stations such as a shaping press, a metering and distribution station for tomato puree or sauce, or several metering stations for the topping, and the baking station, on a preheated transport plate. Each dough base is prepared and provided with a topping according to individual orders from a list.

17 Claims, 7 Drawing Sheets

METHOD FOR PRODUCING PIZZA

CROSS-REFERENCE TO RELATED APPLICATIONS

This application is a continuation-in-part application international application No. PCT/EP98/05093, filed Aug. 12, 1998 and listing the United States as a designated and/or elected country. The entire disclosure of this latter application, including the drawings thereof, is hereby incorporated in this application as if fully set forth herein.

BACKGROUND OF THE INVENTION

Field of the Invention

The present invention relates to a method and the corresponding apparatus for the mechanized and automatic production of ready-to-eat pizza, flat cakes, and the like, starting from fresh ingredients by individual production based on individual single orders.

Methods and apparatuses are known for the automatic industrial production-line and mass-produced production of pizzas and flat cakes, which essentially comprise the following work phases: preparation of the dough including rising of the dough, extruding the dough for the purpose of forming a connected mass, cutting a dough strand into the dough portions, processing the dough portions to flat round cakes, adding seasonings and toppings, baking, packaging for a consumption within the expiration date or, respectively, for deep freezing. The apparatuses for performing this method are voluminous and require much space, furthermore, several conveyor belts are required in order to transport the product from one device to the next. In order to accelerate the production of the dough, some methods employ a pre-treated, dried granulate, the seasoning, topping, and/or stuffing is carried out on a minimum number of pizzas of the same kind and in fact during the passage of the pizzas, which are disposed at small distances relative to each other on the conveyor belt and are subsequently baked in a tunnel oven; some methods bake the pizza in its own baking tins in order to allow the placement and sliding into the baking oven.

The technical features of these known devices do not allow individual production of pizzas according to individual single orders based on a selection from a list.

In addition, installations are known, wherein the pancakes are present in a pre-produced and possibly pre-cooked kind and are taken from the freezer garnished and baked or, respectively, heated up.

SUMMARY OF THE INVENTION

1. Purposes of the Invention

It is an object of the present invention to furnish a method and a corresponding device for mechanical and automatic production of pizzas, ordered individually based on an individual selection from a list, and in fact starting from non-pre-cooked and/or non-deep-frozen ingredients for the dough, which pizzas are individually seasoned, spiced, garnished, stuffed and baked and are available ready for consumption within a short time.

It is another object of the invention to furnish the method and the apparatus such that the production process is performed hygienically and without human intervention and where periodic and automated washing and sterilization cycles are provided for the purpose of maintaining the plant and in particular with reference to the hygiene and the cleanliness of the plant.

It is yet a further object of the invention to furnish periodically and in a simple fashion exchangeable parts, where these parts are coming in contact with foodstuffs and where these parts are not already subjected to the germicidal effect of an elevated temperature.

It is still a further object according to the present invention to construct such an installation for the perishable food components of the pizza and for the emptied packaging material as to allow for a stockkeeping which is appropriate for foodstuffs.

These and other objects and advantages of the present invention will become evident from the description which follows.

2. Brief Description of the Invention

The present invention provides a linear or circular production line for achieving these objects, comprising the following devices:

a conventional mixer including a charge device for the flour mixture or, respectively, a metering device which empties already pre-mixed and pre-proportioned amounts or partial amounts of the dough ingredients into the kneading device;

a conventional metering and weighing device;

a novel kneading and extrusion device;

a novel shaping and molding device for the flat cake;

a novel device for metering tomato pulp with a tomato pulp distributor;

several novel metering and distribution devices;

a novel insertion device for the baking oven;

a novel baking oven;

a novel discharge and removal device for the baked pizza and a transport device for the flat cake from its shaping stage to the baking oven.

The invention does not exclude that one or several of the above-recited novel devices are replaced by one or several corresponding conventional devices. The kneading and extrusion device is an essential component of the method. Two transport and kneading worms, operating perpendicular to each other, allow the kneading and extrusion device to realize an effective mixing of the dough components (flour, salt, sugar, yeast, water, etc.), a homogenization, an interspersing, a densification, and finally the extrusion with the discharge of the portion amount based on an independently controllable rotational speed of the two worms relative to each other. The core piece of this kneading and extrusion device is the transition region from the first worm to the second worm, wherein the second worm disposed perpendicular to the first worm. The dough mass is subjected in this region to a torsion motion with repeated shearing by the worm wall, which effects an intensive interspersing under formation of air bubbles and homogenization, which equals an intensive and continuous kneading through of the mass and is decisive for a uniform shaping and baking through of the flat cake or pizza. The arrangement according to the present invention of the worms, their construction form and the tuning of the worm casing allow in a short time to extrude a professionally prepared portion of dough. The apparatus is cleanly flushed and sterilized with hot air according to a pre-programmed washing and sterilization cycle through an increase of the rotation speed and change of the rotation direction of the worms. A compact dough portion is extruded in case of a proper metering of the ingredients of the dough mixture and upon an exact tuning of the rotation speeds of the two worms. The dough portion is separated at the discharge of the casing, possibly by way of a cutting device, and falls onto the transport plate readied under the casing discharge. A closure plate at the input of the casing and the possible cutting device at the discharge of the casing or at the extrusion nozzle close the kneading device during the standstill of the worms. The transport plate according to the present invention can be produced of different materials and is preferably heated or preheated by electrical thermal resistors so that the dough, or, respectively, the flat cake does not stick to the transport plate and becomes pre-heated during the following work phases in order to obtain thereby the required rigidity in order to not to deform during placement into the baking oven and in order to shorten the baking time.

According to the present invention, the transport plate simultaneously serves as a dough support during the shaping of the flat cake or flat dough base and as a support at the oven entrance during the sliding and placement of the flat cake into the baking oven. It is, however, not excluded that the transport plate is a relatively thin metal sheet, which metal sheet rests on a transport support and is placed together with the flat cake into the baking oven.

The shaping of the flat cake according to the present invention is performed under a press which flattens the dough portion to a predetermined thickness by lowering a horizontal disk against the transport plate disposed below the horizontal disk. The lowerable heated disk is furnished with a ring which is supported horizontally shiftable at a distance to the circular disk's outer edge when subjected to a spring interaction. This ring furnishes a circular form to the outer edge of the flat cake by forming a bead in the intermediate space between the extruder's outer edge and the inner side of the ring during the stamping procedure from the dough squeezed out laterally from between the transport plate and the extruder plate. Initially, the ring rests at the surface of the transport plate during the stamping procedure. Then, based on a further lowering of the press plate, the dough portion is flattened to a flat cake or flat dough base. The springs between the support of the ring and the ring are compressed during this phase. Then the press plate is lifted up again, the springs can thereby be relaxed again. This bead forms at the same time a barrier in order to prevent during the following a distribution of tomato pulp, sauces or purees. The formation of the flat cake with the described apparatus is time-saving and allows always to form a uniform round flat cake with a thicker upwardly projecting edge region even in case of a somewhat different dough portion; simultaneously, it is prevented with the heated transport plate and press plate that the dough sticks to the plate surfaces and achieves a pre-heating of the flat cake.

The transport plate including the formed flat cake is further transported after the shaping of the flat cake under the metering and the distribution device for tomato pulp, sauces or purees. This metering is performed with a peristaltic pump and a ring of nozzles such that several product volumes fall dispersed onto the flat cake disposed therebelow. The distribution of these product volumes is performed with several air beams (foodstuff-suitable air), which exit from air nozzles placed in the region of the product discharge and which several air beams are directed onto the product volumes disposed on the flat cake. It is possible to exchange the complete hose through which the product flows for purposes of cleaning by employing a peristaltic pump, where the feed line, the discharge line, the pump part and the exit nozzles form one single tubular piece. The transport plate passes through several metering stations after the metering station for the tomato pulp, the sauces or the puree, which metering stations can be all of the same kind or of different kinds. The invention teaches in principal two different metering systems, one metering system feeding the garnishing ingredients packed in a bubble band, wherein the ingredients are welded in individual portions in bubbles between two plastic foils, possibly in a controlled atmosphere, and a further metering system, wherein the garnishing ingredients are packed into small dishes, wherein several dishes form a stack and wherein in each case the uppermost dish forms with its floor the cover of the dish below; in this case, the stack of dishes can be packed in a controlled atmosphere. The two packaging systems according to the present invention allow a hygienic foodstuff-friendly packaging, a precise portioning, a simple compact storage within a cooled container in the form of rolls or, respectively, of stacks of dishes, and a controlled waste-free placement onto the surface of the flat cake. As a rule, each of the metering devices for the garnishing ingredients is combined with a dispersing device disposed under the metering devices.

The metering device according to the invention for garnishing ingredients in bubble bands includes a mechanical roller device, wherein the mechanical roller device pulls the bubble band with the welded-in portions from the cooled storage box, and wherein the mechanical roller device pulls apart the two welded foils of the bubble band above the dispersing mechanism, whereby the ingredient portions (finely cut soft cheese, ham pieces, vegetable pieces, etc.) fall onto the dispersing device and are dispersed by vibration by the dispersing device by falling through a sieve and/or through a grate onto the flat cake disposed below the dispersing device. The sieves and/or grates can be easily exchanged and are made out of a dish-washing-machine-proof material or out of materials which provide for a single use; this invention feature allows to maintain hygienic conditions in a simple way by changing the sieve. The rolled-off foil bands in contrast can run into their own container or can also run back into the cooled container of the bubble band.

The metering device for garnishing ingredients packed in stacks of dishes according to the present invention furnishes that these stacks are entered into cooled magazines and are removed from below by moving a slider past these stacks and wherein these stacks are brought to a tilting station for emptying and are then stored as empty dishes. The already described dispersion device is in this case also disposed below the tilting and discharge station.

The possibility exists that the garnishing ingredients are placed onto the flat cake in a heap without a dispersing device. Of course, a dispersing device can be dispensed with in this case.

It is further to be noted that, depending on the order (according to individual desire), only specific garnishing ingredients are to be placed onto the same flat cake or, respectively, that double or three times the amount of the same garnishing ingredients is to be disposed; in the latter case, the flat cake will remain under the same metering station until the corresponding amount of garnishing ingredients has been dispersed onto the flat cake. This metering system offers to furnish several magazines for dish stacks with different garnishing ingredients, which garnishing ingredients are taken from the same slider and which all can be dispersed onto the flat cake at the same production station. Furthermore, the invention provides that the dishes are subdivided into cells and are furthermore possibly furnished with a grid or grate, and in this fashion a uniform distribution onto the flat cake can be achieved already based on the corresponding diameter of the dish and on the disposition of the product in the cells. The contents can be dispersed by vibrating the open and possibly tilted dish in case of dishes with grid or grate. The baking oven of the installation is conceived for the baking of individual flat cakes. The sliding in of the garnished flat cake, continuously pre-heated during the individual recited work phases by the transport plate, can be performed in a traditional mechanical way or by way of the insertion device according to the present invention, which insertion device is furnished at the transport plate itself. The baking oven includes an insertion opening and a removal opening and, according to the invention, the support plate for the flat cake is rear-ventilated at the bottom side in order to furnish a hot air chamber (hypocausts). The oven itself, the support plate for the flat cake and also the two swivel doors are made of a porous vapor-permeable ceramics in order to guarantee thereby the uptake of the baking vapors and the air exchange (breathing) and in order to be able thus to produce a pizza, which equals in taste a pizza baked in a charcoal-fired oven. The baking oven according to the present invention includes a corresponding heat tunnel disposed at the sliding-in opening and at the removal opening, whereby it is prevented during the sliding in or, respectively, during the removal that the air exchange is performed in the baking zone proper with air preheated in these zones by discharge heat.

The withdrawal device according to the present invention comprises in principle an insertable grate or baking sheet which is slid under the baked flat cake, and which roasting support or a sheet metal piece keeps the swivel door open during the operational steps when sliding-in based on an upwardly bent side edge, and wherein the upwardly bent side edge is higher than the pizza such that the pizza cannot be stripped off from the grate or baking sheet. After the actual removal motion, the removal grate is tilted and the pizza slides to the discharge, where a (one-way) plate or a take-out container stands ready. The passage of the heated transport plate from the region below the kneading and extruder station up to the slide-in opening of the baking oven and back again can for example be performed by way of a chain, a toothed belt, or a pull chain; also an arrangement of the individual production stations in a circular layout is not excluded. The invention further does not exclude that the transport plate is driven all the way into the baking oven and that possibly two transport plates are moved with the same drive or with separate drives and/or that the return path is performed on its own guides, possibly at the bottom side, whereby it becomes possible that, for example while a flat cake is being garnished, the next flat cake is already being formed; in this case it can be advantageous to furnish a baking oven with two baking surfaces. There exists however also the possibility that two garnishing lines charge a single, possibly movable, baking oven with several baking zones separated from each other.

The invention method provides that a cleaning and exchange cycle is furnished for the purpose of maintaining hygiene, wherein the cleaning and exchange cycle performs an automatic emptying, flushing and sterilization of the kneading device with hot air and requires the exchange of the hoses including nozzles for the tomato pulp as well as of the grate and/or sieves of the dispersing devices.

The invention is in the following explained in detail by way of a preferred exemplified embodiment illustrated schematically in the accompanying drawings, wherein the embodiment shows an apparatus for the production of pizzas operating according to the invention method; in this context the drawings perform a purely explanatory and not a limiting purpose.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 2 shows a longitudinal sectional view along a section line which contains the two rotation axes of the worms of a kneading and extrusion device according to the present invention.

DESCRIPTION OF INVENTION AND PREFERRED EMBODIMENT

Figure 1:
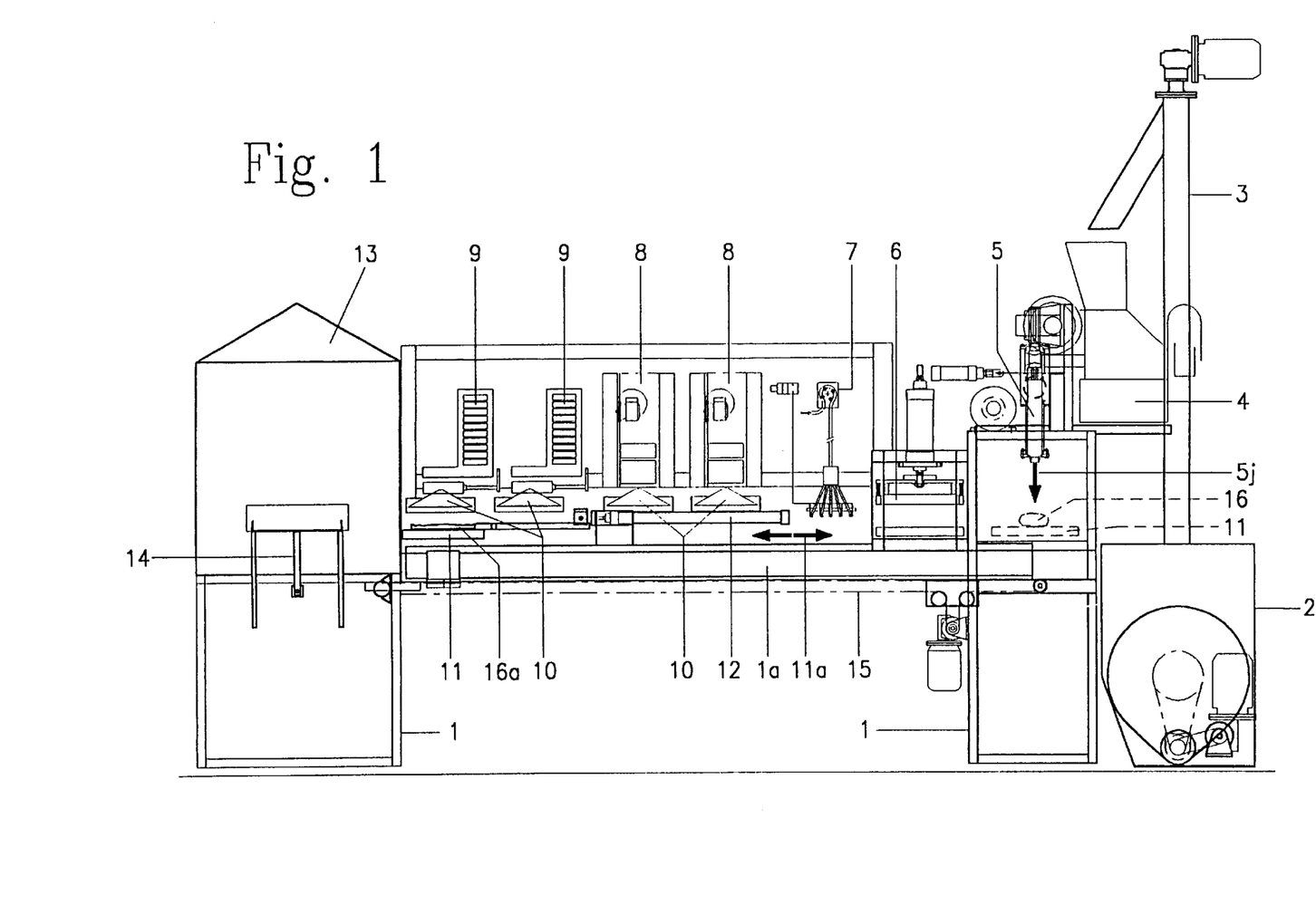
FIG. 1 shows a schematic diagram with a device according to the invention for the production of pizzas without illustration of the cooled containers for the individual ingredients and without containers for the packaging elements produced in a schematic side elevational view.

The apparatus according to the present invention for the production of pizzas according to the method of the present invention essentially consists of a base frame 1 (FIG. 1), wherein a conventional mixer 2 including a conventional charge device 3 and a conventional metering and weighing device 4 for the dough components is attached to one end of the base frame 1.

Figure 1A:
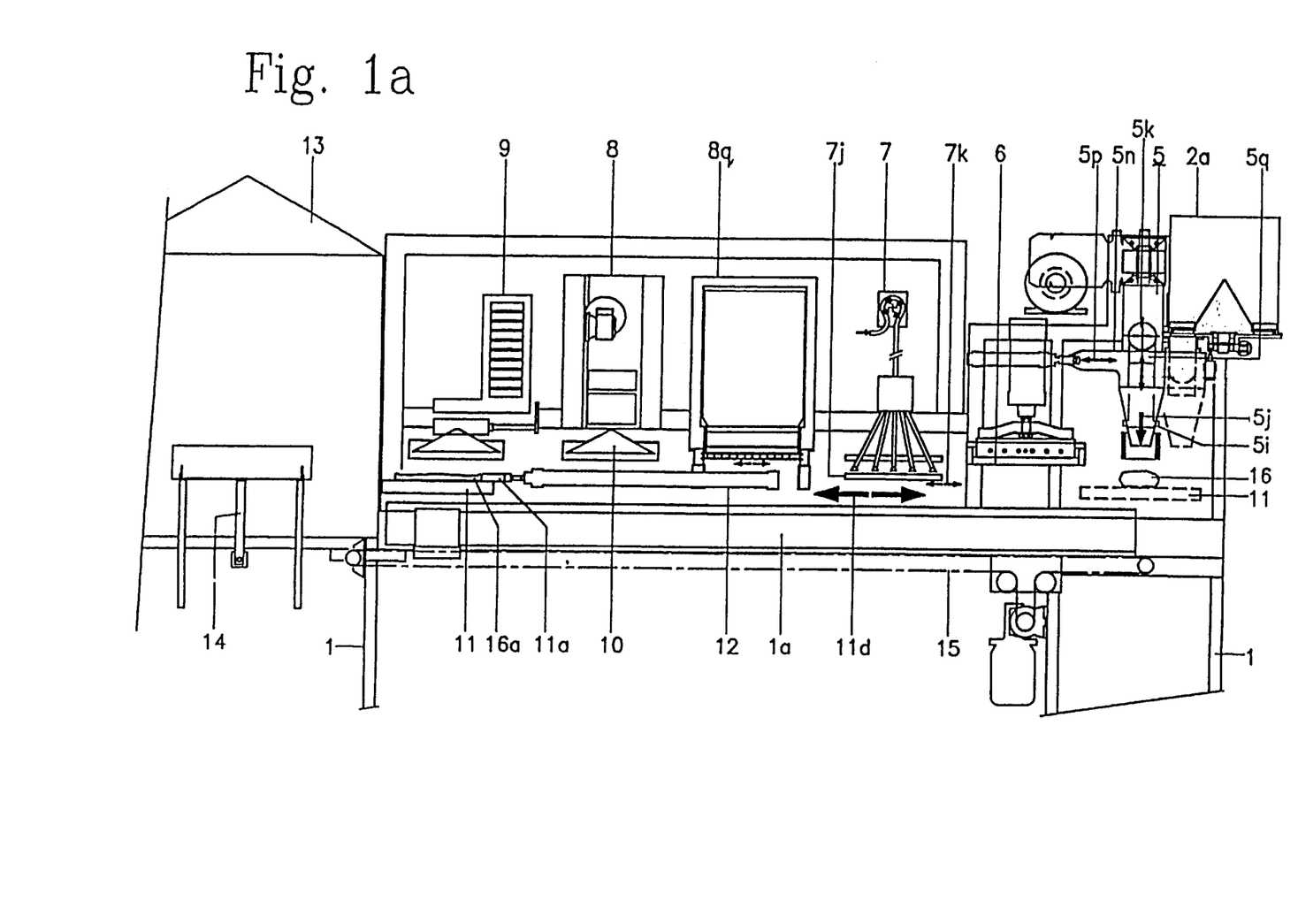
FIG. 1a shows a schematic diagram with a device according to the invention for the production of pizzas similar to the device of FIG. 1, however further illustrating a feeding mechanism employed in dough production.
Figures 2, 3:
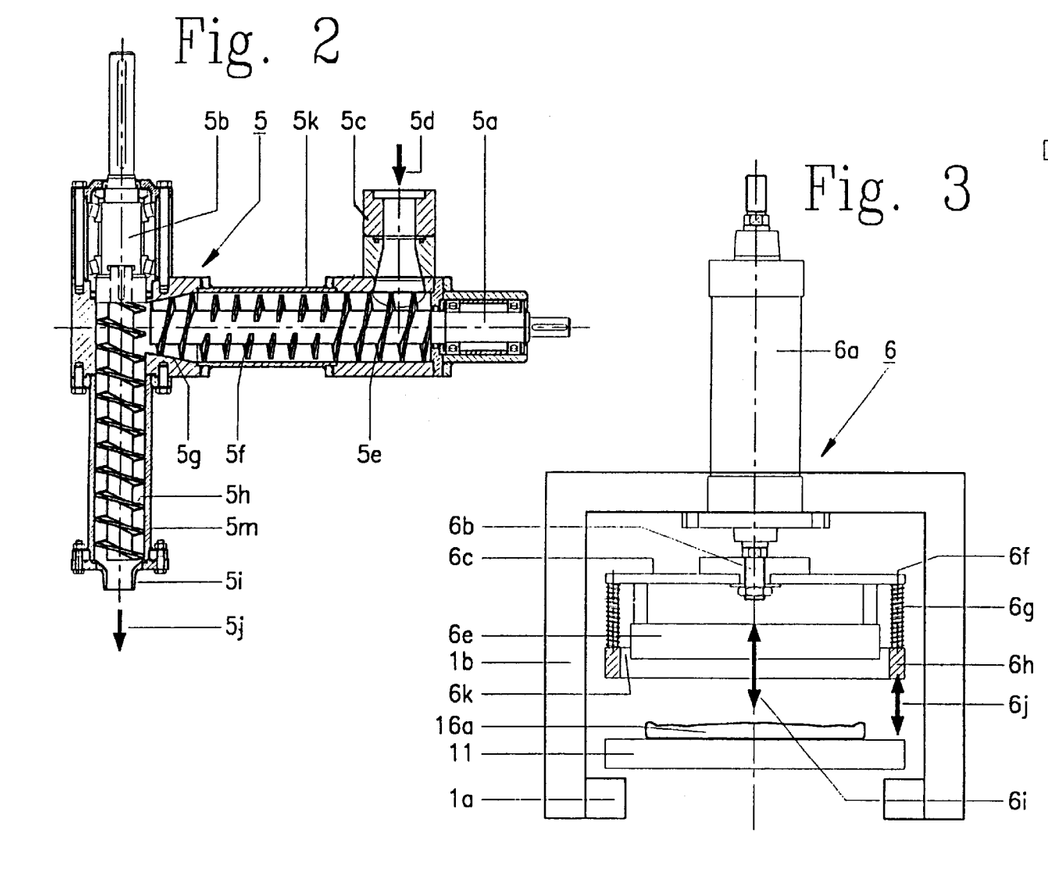
Figure 2A:
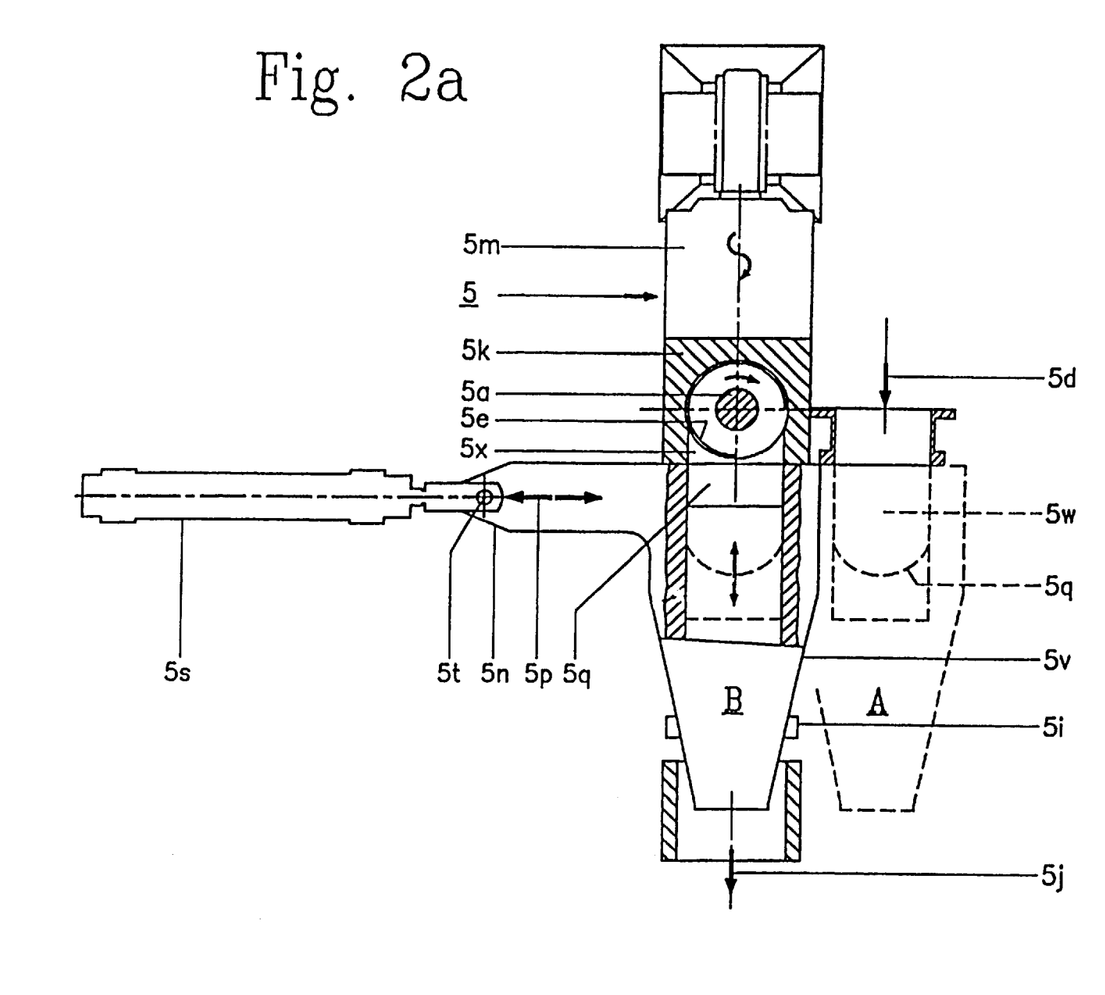
FIG. 2a shows an enlarged side elevational and in part sectional view of the feeding mechanism of FIG. 1a, FIG. 3 shows a schematic sectional view of the shaping device for the flat cakes with the shaping ring according to the present invention.

A feeding mechanism for the device performing dough preparation is shown in FIG. 1a in the overall context of the production line and is shown in more detail in FIG. 2a.

The kneading and extrusion apparatus 5 according to the present invention is furnished at the output of this metering and weighing device 4, wherein the kneading and extrusion apparatus 5 comprises two worms 5a, 5b (FIG. 2) operating perpendicular to each other with corresponding casings 5k, 5m. The dough components (flour, salt, sugar, yeast, water, etc.) pass in a conventional manner 5d into the filling opening 5c, are captured by the coils 5e of the first worm and are transported axially into the kneading region, where the worm coil 5e is interrupted and where adjustable mixing blades 5f are furnished. The casing 5k passes into a conical part 5g in the end region of the worm, where the coil of the worm also is again complete and the dough is densified. The conical part shows an inner diameter reduction to from about 0.5 to 0.8 of the inner diameter of the casing 5k. The dough is transferred from the first worm 5a to the second worm 5b in the following region; the rotation speed of the two worms 5a, 5b can be tuned independently. The dough is subjected to a twisting and a repeated torsion by the coil of the second worm 5h in this transfer region, and an intensive interspersion and air pickup occurs thereby, in the following the dough is further transported to the extruder nozzle 5i and possibly repeatedly densified at the nozzle 5i in order to exit 5j as a compact dough portion 16 and to fall freely onto the transport plate 11 readied therebelow. The invention does not exclude that, instead of a free falling down 5j of the dough portion, a cutting device at the nozzle 5i determines this process and that this cutting device, together with a closure device at the input of the housing 5g closes the casing upon standstill of the worms.

According to the present invention the transport plate 11 is preferably electrically heated, but it is not excluded that the transport plate 11 experiences a heating up in the baking oven itself and only in the following assumes the position under the kneading and extrusion apparatus 5. The transport plate is guided on its own guides 1a at the frame 1 of the installation and is moved back and forth lid by way of chain drive, belt drive, pull train or the like 15 (FIG. 1) between the kneading and extrusion station 5 and the baking oven 13.

As soon as the dough portion 16 rests on the transport plate 11, the transport plate 11 carries 11d the dough portion 16 to the shaping device 6 (FIG. 3); the shaping device 6 comprises a frame 1b, which frame 1b carries a vertically operating cylinder 6a, wherein the piston rod 6b of the cylinder 6a supports a holder 6c, wherein a heated press plate 6e is attached at the holder 6c, and wherein a circumferential ring 6h is supported vertically slidably 6j under an intermediate action of compression springs 6g with a pin 6f at the holder 6c. Upon lowering 6i of the press plate 6e onto the dough portion 16, the dough portion 16 is flattened to a flat cake 16a of a predetermined thickness. Before the press plate 6e flattens the dough 16, the ring 6h rests at the transport plate 11, without preventing a further lowering 6i of the press plate 6e, in this context, the pin 6f slides axially in the holder 6c and the springs 6g are compressed, the dough flowing out between press plate 6e and transport plate is accumulated in the intermediate slot 6k to a circumferential bead. This bead forms a barrier, wherein the barrier prevents that, in particular upon distribution of tomato pulp or other liquid ingredients onto the flat cake 16a, the tomato pulp or other liquid ingredients flow over the edge of the flat cake, furthermore this bead forms a larger support face for the sliding-in mechanism and thus prevents the deformation of the flat cake during the sliding-in into the baking oven 13.

Figure 4:
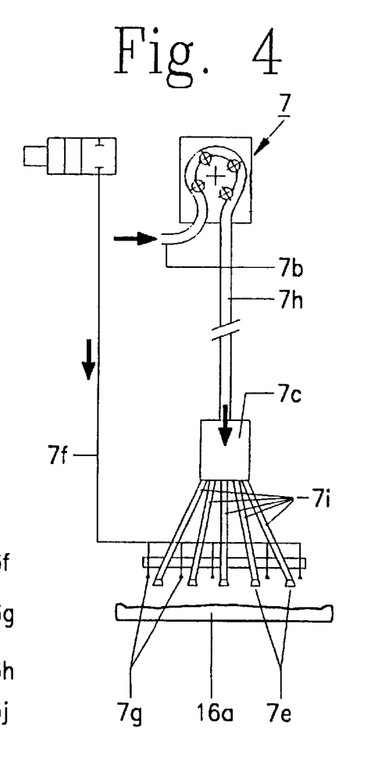
FIG. 4 shows a functional diagram of the metering and distribution station for the tomato pulp or the like, FIG. 5 shows a schematic diagram of a metering device according to the invention for the garnishing ingredients packed in bubble bands according to the invention and a dispersing device for the garnishing ingredients according to the present invention disposed below the metering device.

The formed flat cake 16a is carried 11d further under the tomato-pulp metering device and distributor 7. This device according to the present invention includes a peristaltic pump 7, wherein the feed tube 7b, the pump tube piece 7d, and the discharge tube 7h form an easily exchangeable unit together with the distributor 7 and the branches 7i with the exit nozzles 7e. The branches 7i with the exit nozzles 7e are positioned over the flat cake 16a such that the tomato pulp is deposited in specific amounts at several locations uniformly distributed over the surface of the flat cake. The distribution of these amounts is performed by way of air nozzles 7g coordinated to each exit nozzle 7e, and wherein the air nozzles 7g are fed through a pressure line 7f with compressed air suitable for foodstuff production.

All garnishing components, including the tomato puree can be furnished preproportioned in dishes or in bubble bands and can be emptied and delivered above the flat cakes by corresponding mechanisms 8, 9. In particular in case of employing a dish with a cellular subdivision, then no dispersing device is required.

In the following, the flat cake disposed on the transport plate passes through 11d a series of metering devices and dispersing devices 8, 9, or, respectively, 10 for the garnishing ingredients. The method according to the present invention furnishes that the garnishing ingredients are stored and processed absolutely hygienically and according to the foodstuff regulations. In order to achieve this, the present invention furnishes two different metering devices 8 (FIG. 5), 9 (FIG. 6); one metering device furnishes that the garnishing ingredients 8b be welded between two foils 8c, possibly in a controlled atmosphere; the other metering device furnishes that the garnishing ingredients 18a be packed in plastic dishes 18, wherein stacks of dishes are formed and wherein in each case the cover of the dish is formed by the inserted floor of the next following dish. According to a further embodiment of the present invention, the individual dishes can have the required size and possibly round shape and can exhibit cells in order to be able to dispose the contents already in a uniform shape onto the flat cake by tilting the dish; this method can also be used for more liquid garnishing ingredients such as tomato pulp, sauces and purees. According to a further embodiment of the dishes, the dishes can be furnished with a grate or sieve in order to achieve the distribution of the topping ingredients by vibrating the dish itself. In the two above recited cases, a specific dispersing device 10 is not required and thus the periodic exchange of the grates or sieves 10b is also not required.

Figure 6:
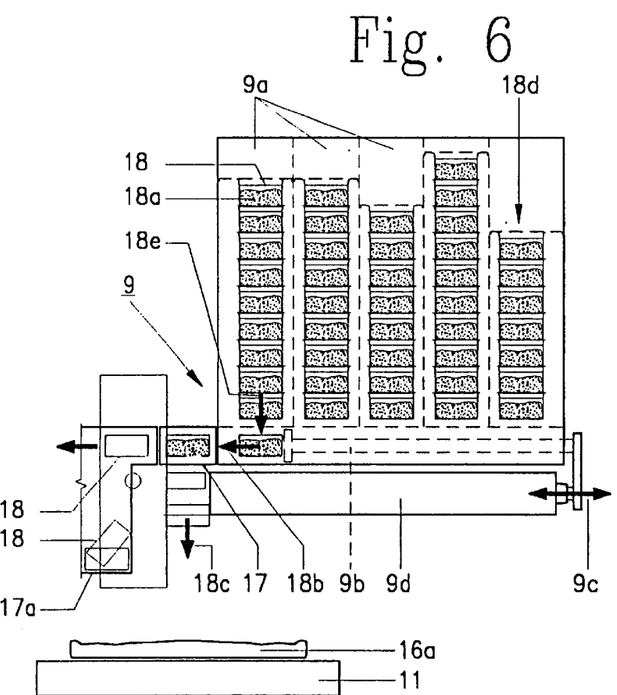
FIG. 6 shows a schematic diagram with a metering device according to the invention for the garnishing ingredients packed in dish stacks according to the present invention, without a dispersing device disposed beneath the metering device.
Figure 6A:
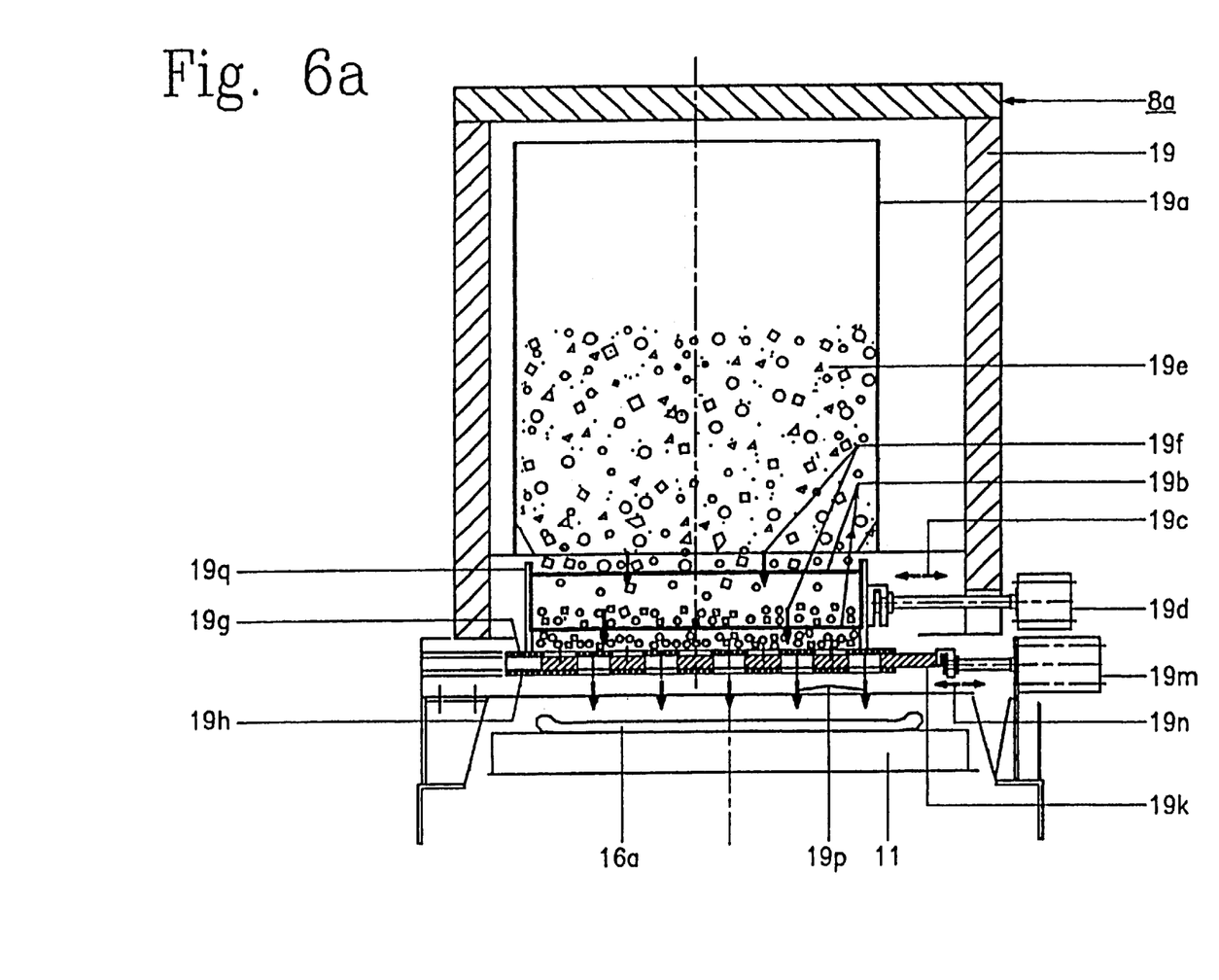
FIG. 6a shows a sectional view of the dispersing and metering device suitable in particular for soft cheeze like mozzarella or other garnishing components sticking together.

The dispersing and metering device 8q shown in FIG. 1a and in detail in FIG. 6a is particularly advantageous for for soft cheeses, for mozzarella cheese, for processed cheese or similar sticky garnishing components.

The metering device 8 (FIG. 5) according to the present invention, which is fed with bubble bands 8a and wherein the bubble bands 8a can be rolled off from a cooled storage container, comprises a single-sided or two-sided feed 8g. The bubble band 8a with the welded-in portions 8b is pulled in by two roller mechanisms 8f through the single-sided or two-sided feed 8g, and in fact such that each of the roller mechanisms 8f pulls apart 8h one of the foils 8c which form the band 8a through corresponding rollers 8e such that the contents 8b of the bubbles is emptied downwardly 8d and either falls directly onto the flat cake 16a or is distributed by a dispersing device 10 according to the present invention disposed therebelow onto the flat cake 16a.

The metering device 9 according to the present invention is fed with stacks of dishes 18d and provides that these stacks 18d are stored in cooled magazines 9a after removal of a packaging, possibly sealed in a controlled atmosphere, wherein the stacks 18d are taken out of the cooled magazines 9a with a slider 9b, wherein the slider 9b is moved 9c through a piston 9d and is slid 18b to a tilting station 17 where the contents is emptied and falls downward 18c while the empty dish 18 (one-way dish or reusable dish) is further slid into a storage container 17a for the empty containers.

When employing the dispersing and metering devices 9, wherein the garnishing ingredients are preproportioned present in dishes, then these dishes can already be stacked in an inclined position, which allows to dispense with a flipping device for the dishes. In this case the contents of the dish will fall on the pizza or onto a dispersing device 10 as soon as the dish is opened.

Of course, in this case as well a known dispersion device or a dispersing device 10 according to the present invention can be furnished under the emptying station 17 and above the flat cake 16a.

Figure 5:
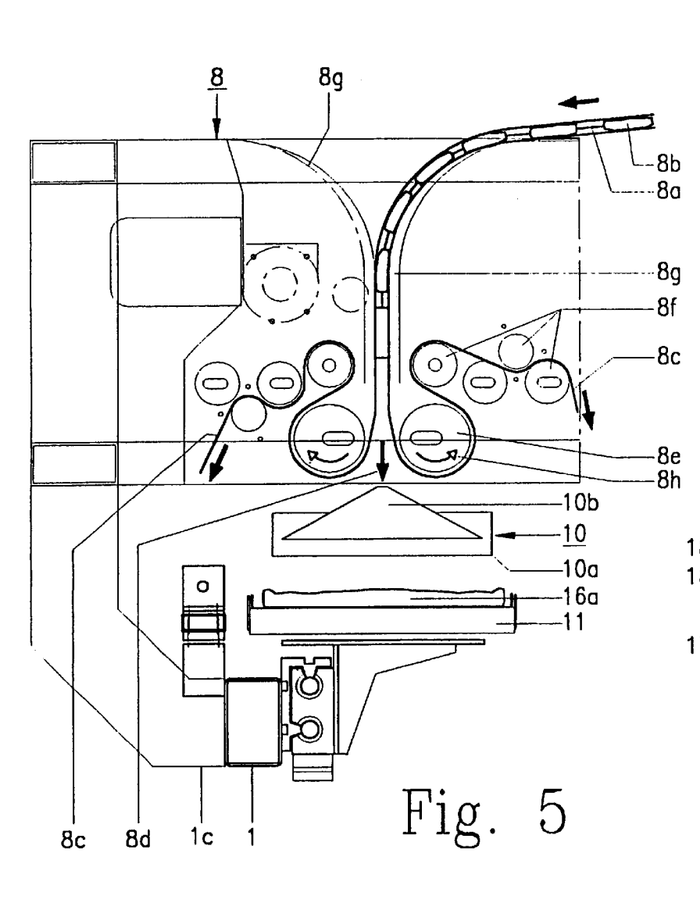

The dispersion device according to the present invention comprises a vibrating holder 10a, wherein a grate and/or a sieve 10b can be inserted easily exchangeable into the holder 10a; these inserts 10b can have different forms, they are tuned to the size of the pieces of the garnishing ingredients and to the diameter of the flat cake and can be exchanged in a one-way method or in a multiple-way method in order to maintain hygienic conditions.

Depending on the order (according to individual desires) also the multiple amount of certain garnishing ingredients can be applied to a flat cake 16a or also several metering stations 8, 9 can be passed over.

The metering station 9 which is fed with stacks of dishes 18d is suitable for the purpose that for example several stacks of dishes 18d can be furnished with different contents 18a and that the flat cake 16a is covered with several different garnishing ingredients under a single one of these metering stations 9. In this case it is required that transport elements are furnished for the individual stacks of dishes 18d, which transport elements move or let fall 18e the respective stack with the desired ingredients with the lowest dish into the operating region of the slider 9b. This construction allows to build the complete plant in a more compact way and to further shorten the running-through motion lid time of the flat cake 16a as well as the production times. Finally the transport plate 11 reaches the insertion opening 13a (FIG. 7) of the baking oven 13 after the flat cake 16a has been garnished according to individual order and the flat cake has in addition also been pre-heated during the work phase on the transport plate 11. According to the present invention, the transport plate 11 can move into the oven and the pizza is stripped off in the baking chamber or the transport plate 11 can dwell in the oven 13 together with the pizza 16a during the baking process and can be heated in the oven 13 and leave the oven 13 only when prompted by the next order, or, according to the present invention, an insertion device 11b can be constructed on the transport plate 11, which insertion device 11b is placed in insertion position by a cylinder 12, wherein the end of the piston rod of the cylinder 12 is furnished with a corresponding latching device 12a, wherein the latching device 12a actuates the insertion device and slides 11c the pizza 16a away 16b over the transport plate 11, through the insertion tunnel 13a, below the opening of the swivel door 13e, into the baking zone, where the pizza remains laying. In the following, the insertion device 11a is again retracted 11c. The opening and reclosing of the swivel door 13e according to the present invention is performed by two pins projecting from the side of the transport plate in a forward direction, which pins swivel open the swivel door 13 toward the baking zone 13c during the approach of the transport plate 11 to the insertion opening 13a, and which pins allow the swivel door to freely swivel closed after the transport plate 11 leaves said position. The pulling out 16c of the baked pizza 16a can be performed in a conventional manner, according to the present invention the pizza can be removed again with the transport plate 11 itself through the insertion opening 13a, or according to the invention the pizza can be removed through a second opening 13b in line with the first opening or staggered, for example by 90 degrees, relative to the first, with its own removal device 14. This removal device 14 according to the present invention comprises a takeout grate 14b, slidable 14d with a cylinder 14g at guides 14a and with upwardly bent side edges, wherein the side edges are higher as compared with the height of the pizza 16a and which side edges open the swivel door 13u upon insertion. The grate 14b is a slid under the baked pizza 16a and is pulled out 14d together with the pizza through the withdrawal tunnel 13b, wherein the swivel door 13u moves again automatically into a closure position. In the following, the take-out grate 14b is swivelled upwardly 14e over a bearing axle 14f, whereby the baked pizza slides off 16c and onto a readied dish or onto a take-out container. The swivel motion of the take-out grate 14b can, of course, also be performed sideways.

Figures 7, 8:
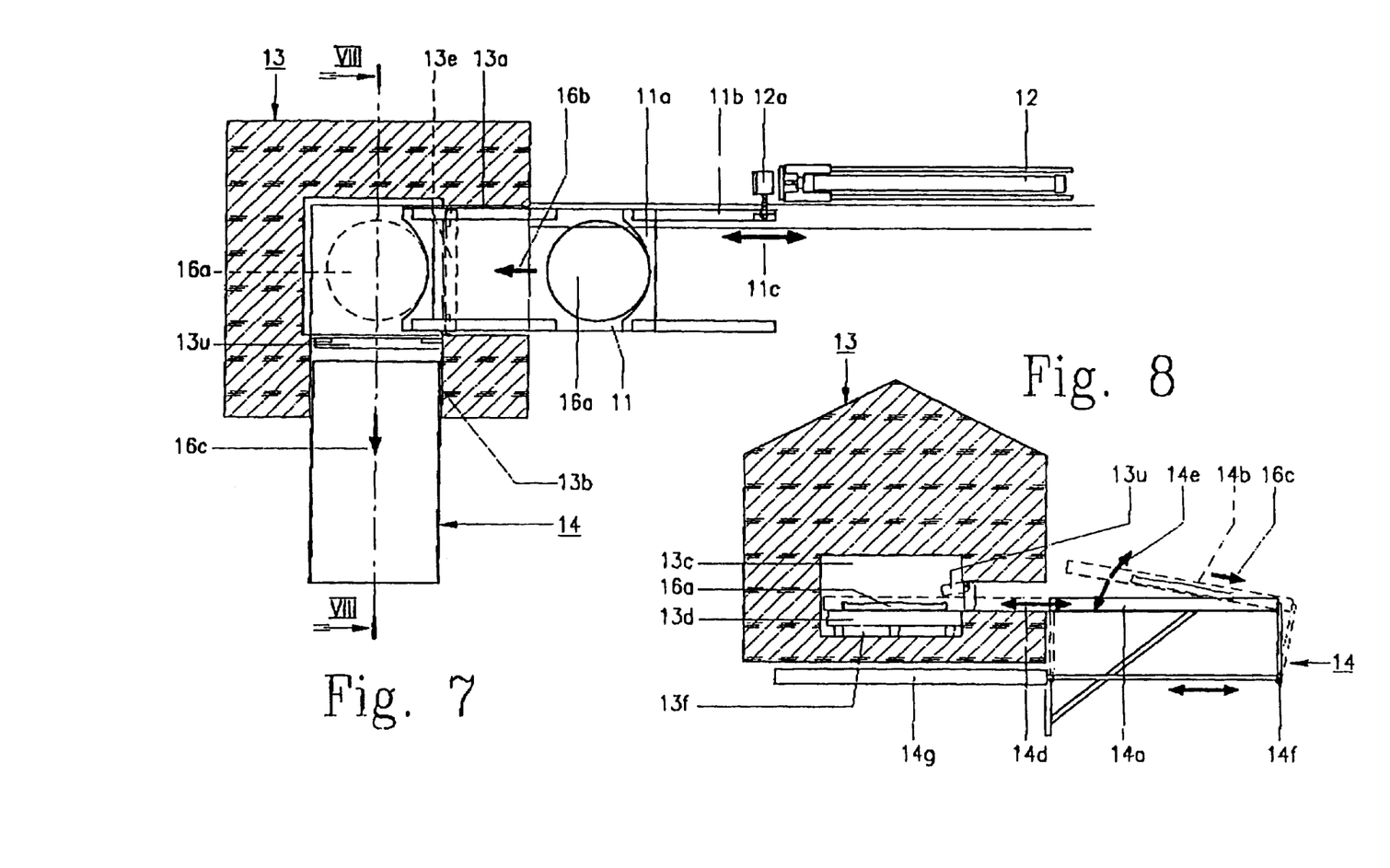
FIG. 7 shows a top planar diagramatic view onto a baking oven according to the present invention including slide-in device and removal device.
FIG. 8 shows a cross-section according to the section line VIII—VIII indicated in FIG. 7 through the baking oven according to the present invention.

All parts of the baking oven 13 according to the present invention which come into contact with the pizza 16a and all parts which form the baking chamber 13c as well as the insertion tunnel 13a and the removal tunnel 13b are breathable, porous ceramic parts. In particular, the support 13d for the pizza 16a in the baking chamber is ventilated according to the present invention by air chambers (hypocausts) 13f. This construction allows that the vapors are absorbed continuously through the porous lining elements and the support elements and are discharged to the outside; practical operation has shown that these porous materials and the construction according to the present invention with a support 13d ventilated from below, with insertion tunnel and removal tunnel 13a, 13b and the ceramic swivel doors 13e, 13u allow to bake a pizza, which equals a traditional charcoal-oven baked pizza in taste. Furthermore, it has been observed that in particular the swivel doors 13e, 13u made of ceramics as well as all remaining ceramic parts are not attacked by chemically aggressive vapors or acid-containing splashes (tomato pulp). Of course, the swivel doors can also be replaced by vertically guided doors, furthermore, the baking oven can also be constructed for two or more baking locations disposed next to each other, in series, or also on top of each other and can be fed by production lines disposed parallel to each other, disposed on top of each other, or disposed in different directions or in a circle; also, the baking oven can be disposed movable between the production lines.

A further feature of the baking oven according to the invention is that the baking chamber is limited closely to the measurement of the goods to be baked and that the air exchange in the baking zone 13c is performed by air which is pre-heated in the insertion tunnel 13a or, respectively, in the removal tunnel 13b during the insertion or, respectively, during the removal of the flat cake 16a.

The method according to the present invention and the corresponding device allow:

1. The kneading, forming, garnishing, baking and the delivery of pizza to the customer starting from the base components (flour, water, fermenting agent, rising agent, salt, etc.) and the garnishing ingredients (tomato puree, mozzarella, ham, mushrooms, etc.) and without human interaction:

a. By completely automatic preparation of the dough within a short time in the apparatus, wherein the base components (flour, water, fermenting agent, rising agent, salt etc.) are automatically portioned or are already pre-portioned by feeding in the ingredients with a bubble band (8a) or with dishes (18) united to stacks, wherein a single flour mixture portion is transported into the kneading device or wherein the flour mixture part amounts are entered and transported into the kneading device.

A particularly suitable mechanism to furnish the flour mixture portion into the kneading device can be recognized from FIG. 2a. This entering mechanism comprises a casing 5v which casing 5v is moved 5p by an operating cylinder 5s working through bolts 5t at an arm 5n from a receiving position A (shown in dashed lines) into an entering position B. The flour mixture falls 5d in the receiving position A and is transported by a known portioning mechanism from the container 2a into the filling chamber 5w onto the filling piston 5q. The container 2a including the portioning mechanism can be substituted by a roller mechanism 8f for the bubble bands 8a or by a stack of dishes 18d with emptying mechanism.

After the casing 5v of the entering mechanisms has been brought 5p by the cylinder 5s into the entering position B, then the piston 5q including the thereupon disposed flour portion is lifted by a cylinder, wherein the flour mixture passes through an opening 5x to the casing 5k of the kneading device into the operating region of the first worm 5a and is further transported by the first worm 5a in axial direction into the mixing and kneading region. According to the present invention in each case the quantity for a single flat cake is kneaded and extruded 5j.

b. By forming of a flat cake, wherein the flat cake is pre-baked by the pre-heated, or permanently heated transport plate 11 during the forming and also during the successive processing phases up to sliding into the baking oven and thereby receives the necessary consistency, which enables a sliding in 11c without deformation of the flat cake 16a and which therefore enables the baking directly on the ceramic surface 13d in the baking oven 13.

c. By a presence of all garnishing ingredients pre-portioned in bubble bands 8a and/or in dishes 18 and by placing with the devices for metering of garnishing ingredients, with or without dispersing mechanism 10, onto the flat cake. This holds also for the tomato puree, for mozzarella or ham.

Practical experience has shown that the device for metering and distribution of tomato puree as shown in FIG. 4 can be simplified by having a larger number of nozzles in the nozzle ring 7e in order to obtain thereby a uniform distribution of the product also without air nozzles 7g. It has been noticed that the tomato puree applied in this fashion is further distributed on the surface of the flat cake by the thereafter provided application of mozzarella or other garnishing ingredients and in particular by the melting process and the thermal interaction. In order to prevent a soiling by dripping tomato puree from the nozzles after the flat cake has been transported 11d there is slid 7k a capturing cup 7j under the nozzle ring 7e. This capturing cup 7j is exchanged during the maintenance of the installation by a clean cup.

2. The selection and/or combining of the garnishing ingredients (tomato puree, mozzarella, ham, salami, mushrooms, etc.) also for each individual order from the customer after the selection from an offer list:

a. By having readily available pre-portioned garnishing ingredients in bubble bands 8a and/or in dishes 18 and the corresponding metering devices 8, 9 and dispersion devices 10.

3. The unproblematic and uniform application of garnishing components such as for example mozzarella, which are present in comminuted form but which have the tendency to stick:

a. Based on a metering and dispersing device 8a (FIG. 6a) comprising cooled container 19, wherein a downwardly flipped container 19a with a downward opening and with the comminuted present garnishing product 19e is disposed in the cooled container 19. A double grid 19b is furnished under the opening of the flipped container 19a, which double grid 19b is moved by a known rattling mechanism 19d in a direction perpendicular to the exit direction 19f of the garnishing components 19e. The two grids or grates 19b are disposed parallel to each other and at the distance from each other, wherein the passage openings are tuned to the piece size of the garnishing ingredients and can be different for the two grids or grates 19b. The metering and dispersing device is furnished under these rattling grids 19d. The metering and dispersing device comprises a longitudinally shiftable 19n perforated plate 19k, which perforated plate 19k is led between two parallel disposed perforated sheet metal pieces 19g and 19h. The bore holes of the upper perforated sheet metal piece 19g are, relative to the bore holes of the lower perforated sheet metal piece, staggerred thereby at least by the diameter of the perforation hole. The perforated plate 19k is staggered initially into a position during the longitudinal motion 19k with its boreholes, where its bore holes coincide with the boreholes of the upper perforated sheet metal piece 19g; in this position the garnishing pieces 19e, which have fallen 19f through the shaking grids 19b, fall through the boreholes of the upper perforated sheet metal piece 19f, through the boreholes of the upper perforated sheet metal piece 19g and fill the boreholes of the perforated plate 19k, which are thereupon shifted 19n in the longitudinal direction. As soon as the boreholes of the perforated plate 19k coincide with the boreholes of the perforated sheet metal piece 19h, then the garnishing particles 19e can freely fall downwardly onto the pizza 16a. The number and the disposition of the boreholes in the perforated sheet metal pieces 19g, 19h and in the perforated plate 19k are selected such that a dispersion as uniform as possible and the surface covering is achieved. The invention does not exclude that the perforated plate 19k is disposed rotatable between the perforated sheet metal pieces 19g, 19h and in each case is moved further in this direction around the staggered hole distance of the concentrically disposed bore holes or is moved forward and backward. The filling of the boreholes of the perforated plate 19k is favored by the surrounding wall 19q, which connects the rattling grids 19b and which drags with its lower edge on the upper perforated sheet metal piece 19g; some continuously possibly sticking garnishing particles are individualized by the motion 19c of the rattling grids 19b and of the wall 19q.

4. The start of the proper baking phase of the pizza in the oven 13 occurs already after about 20 seconds (from about 10 to 40 seconds) after the order placement by the customer:

a. This extremely short preparation time of the raw product is made possible by the employment of the invention device for the preparation of the dough 5 (FIG. 2) and by the recited pre-portioning of the base components and/or of the garnishing ingredients according to the present invention.

5. The discharge and delivery of the baked pizza within about 90 seconds after ordering by the customer; this short time is made possible not only by the extremely short preparation time of the raw product (about 20 seconds, compare point 4) but in addition by the short baking time of about 70 seconds which is achieved by the following arrangements according to the present invention:

a. By the pre-heating of the dough or, respectively, of the flat cake immediately after the exit 5j out of the extruding nozzle 5i on the pre-heated or, respectively, continuously heated transport plate 11, during the formation of the flat cake and during the application of the garnishing ingredients, b. By the baking of the flat cake and also of the applied garnishing ingredients upon passing 16b of the pre-heating tunnel 13a, of the baking oven 13, c. By the baking of the pizza in an oven 13 made of a breathing porous ceramic with a spatially relatively narrow limited baking zone 13c, with the swivelled doors 13e, 13u, with a ceramic support plate 13d for the baking material, and with air spaces 13f (hypocausts), d. By the pre-heating of the insertion tunnel 13a as well as the withdrawal tunnel 13b, which in each case are passed through and flowed through by the hot air of the baking zone 13c during the insertion 16b of the pizza or, respectively, during the withdrawal 16c of the pizza, e. And in particular by the direct contact of the pizza with the hot, porous support plate 13d, without intermediate disposition of a baking form or of a baking sheet metal or of a transport conveyor band, which would interfere with the heat transfer and also the escape of the humidity from the dough mass.

6. The automatic repetition of the complete course of production initiated by each new order placed, also upon ordering of several like or different kinds of pizza, without use of the prepared (deep frozen and/or pre-cooked) flat cakes and/or garnishing ingredients:

a. By the pre-proportioning of the dough base components and of the garnishing ingredients, which in each case are taken as quantity units (bubble band, dish stack) from (possibly cooled) storage containers, b. By the automatic opening and emptying of the portion package containing the ingredients and the dispersion of the ingredients, or c. By the lack of residues from production.

7. The automatic course and sequence of all phases of the production without human interference as long as not one of the components has been used:

a. By the automization and programming of the switching on and off of the operation, of the surveillance, of the cleaning end of the hygienization of the apparatus, b. By the periodical exchange of components such as dispersion grate 10b, feed lines 7b, 7d, 7h, 7i, catching cups 7j and nozzles 7e, wherein spoilable residues of food can contact the recited elements, c. By the automatic cleaning of the apparatus for the production of dough, d. By the automatic collection of the packaging material (emptied bubble bands, emptied dishes).

It will be understood that each of the elements described above, or two or more together, may also find a useful application in other types of baking system configurations and dough processing procedures differing from the types described above.

While the invention has been illustrated and described as embodied in the context of a method and device for producing pizza, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for a mechanized and automatic production of flat cakes and/or pizzas comprising organizing production and garnishing of a flat cake based on an individual order according to a selection list;

preparing an individual flat cake precursor of dough ingredients as an individual dough portion, wherein the pizza is produced by taking into consideration a desired amount of individual ingredients for preparing the dough, and wherein pre-proportioned dough ingredients are employed;

passing the precursor through a kneading and extrusion apparatus;

passing the precursor on a heated transport plate through a shaping press;

passing the precursor on a heated transport plate through a metering and distribution device for tomato pulp, and sauces;

passing the precursor on a heated transport plate through a metering station for the garnishing ingredients, wherein the flat cake is topped with garnishing ingredients under the metering station for the garnishing ingredients, wherein pre-proportioned amounts of garnishing ingredients are employed, and wherein the pizza is produced by taking into consideration a desired amount of the garnishing ingredients and/or spices;

passing the precursor on a heated transport plate through a baking station, wherein the production comprises a complete production cycle, wherein no pre-produced and/or pre-cooked semi-finished products are employed in the production; and maintaining permanently parts of a production installation which are not already subjected to a continuous germicidal effect based on temperature influence in a hygienic state corresponding to the regulations concerning foodstuffs either by a programmed cleaning and sterilization cycle employing water and hot air in connection with cleaning and germicidal agents and/or by a simple exchange of the device components; wherein no baking forms are used for the flat cakes and wherein no already preshaped flat cakes are employed in the production.

2. The method according to claim 1 further comprising starting a production cycle with a heating of a transport plate; wherein the baking process for the pizza starts already with the shaping of the flat cake, and wherein the baking process continues during the complete following work phases for garnishing, stuffing, and seasoning such that the pizza disengages without any problem from the support plate upon insertion into the baking oven and exhibits the necessary consistency in order to be slid into the oven with a slide-in mechanism without deforming the flat cake or, respectively, to be retained in the oven.

3. The method according to claim 1 further comprising mixing pre-metered dough components;

kneading pre-metered dough components;

densifying pre-metered dough components;

homogenizing pre-metered dough components;

extruding pre-metered dough components as compact dough portions;

ejecting pre-metered dough components from two worm casings disposed successively and perpendicular to each other with corresponding worms, wherein in particular in the region of the transition of the dough from the first worm to the second worm the dough experiences an intensive interspersing based on a torsion and repeated shearing, which intensive interspersing favors an incorporation of air;

closing the feed to the first worm casing and the exit opening of the second worm casing upon standstill of the apparatus by a slider or, respectively, by a separating spatula for the dough portion;

adapting the rotation speed of the two worms by an independent setting to the properties and to the quantity ratio of the ingredients; and increasing the rotation speed of the worms and changing the direction of rotation during a flushing and sterilization cycle.

4. The method according to claim 1 further comprising shaping the flat cake is performed by a heated pressing device, forming the dough welling up between press faces in an edge region as an edge bead in order to form thus a barrier for the successive placing and distribution of ingredients on the surface of the flat cake and in order to form a larger rest face for the insertion mechanism, which prevents a deformation of the flat cake during insertion into the oven.

5. The method according to claim 1 further comprising moving a single transport plate back and forth between a dough extruder station and the baking oven along the production line of the installation and wherein the single transport plate is possibly pre-heated in the baking oven.

6. The method according to claim 1 further comprising moving a single transport plate along a plane in direction of the baking oven along the production line of the installation and moving along a plane disposed below the baking oven in a direction of the dough extruder station.

7. The method according to claim 1 further comprising employing two transport plates for the same production line, which transport plates are moved by a common drive mechanism.

8. The method according to claim 1 further comprising arranging the production line in a circle, wherein a transport plate is furnished.

9. The method according to claim 1 further comprising employing several production lines for feeding a baking oven with several baking chambers.

10. The method according to claim 1 further comprising inserting and removing the flat cakes through a single oven opening.

11. The method according to claim 1 further comprising inserting the flat cakes into the oven through an own insertion opening of the oven; and removing the flat cakes through a removal opening of the oven, wherein the removal opening is aligned with the respective insertion opening or is furnished staggered or, respectively, twisted relative to this insertion opening.

12. The method according to claim 1 further comprising employing a controlled atmosphere for surrounding the garnishing ingredients and spices in form of unit portions combined to bubble bands or to stacks of dishes in cooled storage containers, from which storage containers the garnishing ingredients and spices are removed in each case immediately prior to use, and wherein the dough components are kept in storage as a mixture or in the shape of partial mixtures in such packaging, and wherein the dough components are emptied as required above the dough kneading station and extrusion station.

13. The method according to claim 1 further comprising containing the garnishing ingredients of a liquid consistency in dishes with a cellular subdivision, and wherein the uniform distribution on the surface of the flat cake is performed by tilting the dish, by the corresponding dish diameter, without dispersing device and without distribution through air beams.

14. The method according to claim 1 further comprising furnishing the dishes themselves with a grate or sieve for the garnishing ingredients and emptying the dishes through vibration in a tilted position, wherein the contents of the dishes is dispersed onto the surface of the flat cake.

15. A method for a mechanized and automatic production of flat cakes and/or pizzas without using baking forms for the flat cakes and without already preshaped flat cakes, wherein the flat cake is topped with garnishing ingredients under at least one garnishing station, comprising the steps of each, individual flat cake (16a) is prepared of individual dough ingredients or of a pre-portioned mixture of ingredients as an individual dough portion (16) in a kneading and extrusion apparatus (5) and passes in the following on a pre-heated or continuously heated transport plate (11) through a series of processing stations including a shaping press (6), a metering and distribution device (7) for tomato pulp, sauces, one or several metering stations (8, 9) for the garnishing ingredients, as well as the baking station (13), by having the flat cake (16a) produced and garnished based on individual order according to a selection list, wherein the production comprises a complete production cycle, wherein the pizza is produced also by taking into consideration a desired amount of the garnishing ingredients and/or spices starting from the individual ingredients for preparing the dough, without use of pre-produced and/or pre-cooked semi-finished products, under use of pre-proportioned garnishing ingredients or, respectively, dough ingredients, and wherein parts of a production installation which are not already subjected to a continuous germicidal effect based on temperature influence are maintained permanently in a hygienic state corresponding to the regulations concerning foodstuffs either by a programmed cleaning and sterilization cycle employing water and hot air in connection with cleaning and germicidal agents and/or by a simple exchange of the device components (7b, 7c, 7d, 7h, 7i, 7e; 10b).

16. The method according to claim 15, wherein the production cycle starts with the pre-heating of a transport plate (11) in the baking oven (13) or by heating elements built into the transport plate (11), wherein the baking process for the pizza (16a) starts already with the shaping (5) of the flat cake (16a), and wherein the baking process continues during the complete following work phases for garnishing, stuffing, and seasoning either based on the heat dissipation of the pre-heated transport plate (11) or by the continuous heating of the transport plate (11), such that the pizza (16a) disengages without any problem from the support plate (11) upon insertion (16b) into the baking oven (13) and exhibits the necessary consistency in order to be slid into the oven (13) with a slide-in mechanism (11a) without deforming the flat cake or, respectively, to be retained in the oven (13);

wherein the pre-metered dough components are mixed, kneaded, densified, homogenized and extruded as compact dough portions (16) and are ejected (5j) from two worm casings (5k, 5m) disposed successively and perpendicular to each other with corresponding worms (5a, 5b), wherein in particular in the region of the transition of the dough from the first worm (5a) to the second worm (5b) the dough experiences an intensive interspersing based on a torsion and repeated shearing, which intensive interspersing favors an incorporation of air, wherein the feed (5c) to the first worm casing (5k) and the exit opening (5i) of the second worm casing (5m) is closed upon standstill of the apparatus by a slider or, respectively, by a separating spatula for the dough portion, wherein the rotation speed of the two worms (5a, 5b) can be adapted by an independent setting to the properties and to the quantity ratio of the ingredients, and wherein the rotation speed of the worms (5a, 5b) is increased and the direction of rotation is changed during the flushing and sterilization cycle;

wherein the shaping of the flat cake is performed by a heated pressing device, wherein the dough welling up between the press faces in the edge region is formed as an edge bead in order to form thus a barrier for the successive placing and distribution of ingredients on the surface of the flat cake and in order to form a larger rest face for the insertion mechanism (11d), which prevents a deformation of the flat cake during insertion into the oven;

wherein a single transport plate (11) moves back and forth (11a) between the dough extruder station (5) and the baking oven (13) along the production line of the installation and wherein the single transport plate (11) is possibly pre-heated in the baking oven (13);

wherein a single transport plate (11) moves along a plane in direction of the baking oven (13) along the production line of the installation and moves along a plane disposed below the baking oven (23) in a direction of the dough extruder station (5).

17. The method according to claim 15, wherein two or more transport plates (11) are furnished for the same production line, which transport plates (11) are moved by a common drive mechanism (15);

wherein the production line is arranged in a circle, wherein one or several transport plates (11) can be furnished;

wherein several production lines feed a baking oven with several baking chambers, separated from each other, or feed a baking oven (13), which is shifted in each case to the respective production line in case of need;

wherein the flat cakes (16a) are inserted and removed through a single oven opening (13a);

wherein the flat cakes (16a) are inserted into the oven (13) through its own insertion opening (13a) and are removed through its own removal opening (13b), which removal opening (13b) is aligned with the respective insertion opening or is furnished staggered or, respectively, twisted relative to this insertion opening;

wherein the garnishing ingredients and spices are present in a controlled atmosphere, in form of unit portions (8, 18a) combined to bubble bands (8a) or to stacks of dishes (18d) in cooled storage containers, from which storage containers the garnishing ingredients and spices are removed in each case immediately prior to use, and wherein also the dough components are kept in storage as a mixture or in the shape of partial mixtures in such packaging, and wherein the dough components are emptied as required above the dough kneading station and extrusion station (5);

wherein the garnishing ingredients possibly also of a liquid consistency are contained in dishes (18) with a cellular subdivision, and wherein the uniform distribution on the surface of the flat cake is performed by tilting the dish (18), by the corresponding dish diameter, without dispersing device (10) and without distribution through air beams;

wherein the dishes (18) themselves are furnished with a grate or sieve for the garnishing ingredients (18a) and are emptied through vibration in a tilted position, wherein the contents is dispersed onto the surface of the flat cake.

* * * * *